Feb. 9, 1971  F. G. STONE  3,561,815
COMBINATION WINDSHIELD AND HANDLEBAR FOR
MOTORCYCLES AND THE LIKE
Filed June 21, 1968
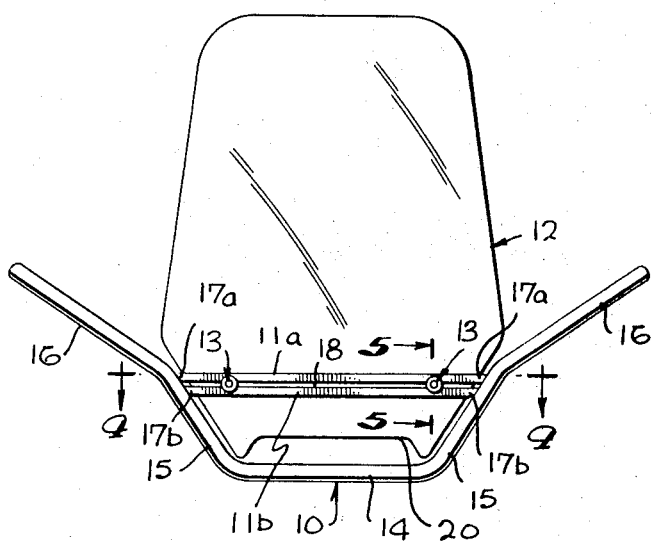
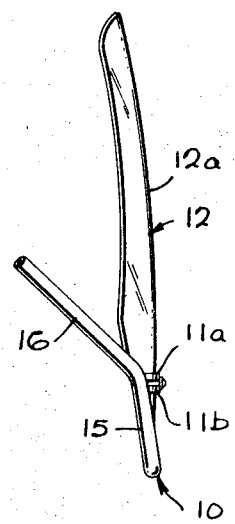
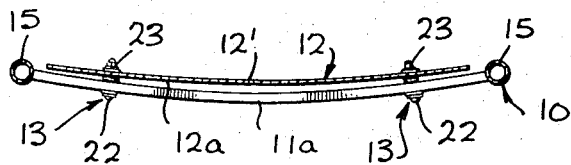
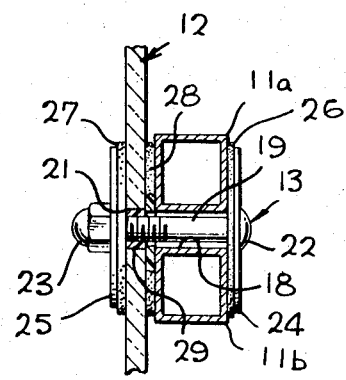
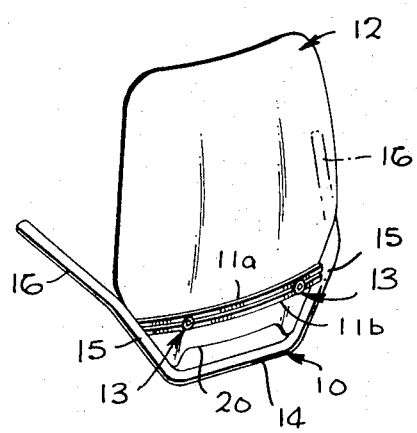
FRANK G. STONE
INVENTOR.
BY Allan M. Shapiro
ATTORNEY

United States Patent Office 3,561,815
Patented Feb. 9, 1971

3,561,815
COMBINATION WINDSHIELD AND HANDLEBAR FOR MOTORCYCLES AND THE LIKE
Frank G. Stone, Long Beach, Calif., assignor of one-half to Peter Mead, Canoga Park, Calif.
Filed June 21, 1968, Ser. No. 749,525
Int. Cl. B60j 1/02
U.S. Cl. 296—78.1
5 Claims

ABSTRACT OF THE DISCLOSURE

A combination windshield and handlebar for motorcycles and the like. The device comprises a conventional handlebar, extending between portions of which are a pair of arcuate, spaced, parallel crossbars. A convex windshield, preferably of plastic, is attached to the crossbars by means of carriage bolts which extend through the opening between the crossbars and through a pair of spaced holes in the windshield.

BACKGROUND OF THE INVENTION

(1) Field of the invention

The present invention relates to a combination windshield and handlebar for motorcycles and the like and, more particularly, to a handlebar provided with a pair of horizontal crossbars adapted for attachment thereto of a one-piece windshield.

(2) Description of the prior art

Recent years have seen a tremendous increase in the popularity of motorcycles, scooters and similar vehicles. An ever increasing variety of such equipment is available for purchase, and the motorcycle manufacturer continually strives for simplicity of construction and attractiveness of design to insure commercial success.

In line with such economic considerations, many small motor scooters and some motorcycles have not been provided with a windshield because of the cost and bulkiness which has been associated in the past with such equipment. Where windshields have been provided, they are often cumbersome, requiring a metal frame around at least a portion of the windshield, the frame being attached by special brackets to the handlebar. Such assemblies make windshield replacement difficult, and are not aesthetically pleasing.

To overcome the shortcoming of the prior art, the present invention provides a combination windshield and handlebar of attractive design and simple construction, easily and economically incorporated in a motorcycle or similar vehicle.

SUMMARY OF THE INVENTION

In accordance with the present invention, there is provided a combination windshield and handlebar for motorcycles and the like. The inventive combination comprises a substantially conventional handlebar extending between portions of which is apertured crossbar means preferably comprising a pair of horizontally arcuate, vertically spaced, parallel crossbars. A convex plastic windshield is attached to the crossbars by means of carriage bolts which extend through the opening between the crossbars and through a pair of spaced holes in the windshield.

Thus, it is an object of the present invention to provide an improved combination windshield and handlebar for motorcycles, scooters and similar vehicles.

It is another object of the present invention to provide a combination handlebar and windshield of simple construction and attractive design.

Another object of the present invention is to provide improved means for attachment of a windshield to a handlebar.

Yet a further object of the present invention is to provide in combination a conventional handlebar having a pair of spaced crossbars extending horizontally between portions thereof, and a windshield attached to the crossbars by means of carriage bolts or the like.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIGS. 1, 2 and 3 respectively show front perspective, front elevation, and side elevation views of the inventive combination windshield and handlebar for motorcycles and the like;

FIG. 4 is a top plan view, partly in section of the inventive combination windshield and handlebar, as seen generally along line 4—4 of FIG. 2; and FIG. 5 is an enlarged fragmentary sectional view, partly in elevation, illustrating the preferred manner of attaching the windshield to the crossbar means, as seen generally along line 5—5 of FIG. 2.

DESCRIPTION OF THE PREFERRED EMBODIMENT

Referring now to the drawings, the overall appearance of the inventive combination windshield and handlebar for motorcycles and the like is best illustrated in FIGS. 1, 2 and 3. A substantially conventional handlebar 10 is seen therein, extending between portions of which are a pair of spaced parallel crossbars 11a and 11b. A one-piece transparent windshield 12, typically of a plastic such as plexiglass, Lucite or the like, is attached by means of a pair of carriage bolts 13 to crossbars 11a and 11b, to complete the combination.

As evident in FIGS. 1, 2 and 3, handlebar 10 is of unitary conventional construction, typically comprising a metallic tube appropriately bent symmetrically to form a centrol portion 14, intermediate portions 15 and end portions 16. When mounted on a motorcycle, scooter or similar vehicle, central handlebar portion 14 is substantially horizontal, with handlebar intermediate portions 15 extending upwardly and slightly rearwardly thereof, as best shown in FIG. 3. Handlebar end portions 16, which generally are provided with plastic or rubber hand grips (not shown), extend backward and outward with respect to intermediate portions 15, as may be seen in FIGS. 1 and 2.

In the illustrated preferred embodiment, spaced parallel crossbars 11a and 11b are of tubular construction, each having a substantially rectangular cross-section as shown in FIG. 5. The respective ends 17a and 17b (see FIG. 2) of crossbars 11a and 11b are fixedly attached, as by welding, to the upper ends of handlebar intermediate portions 15, ends 17a and 17b being spaced apart in a generally vertical plane. The elongate opening 18 between parallel crossbars 11a and 11b is of a vertical width appropriate to permit clearance therethrough of at least the threaded shank portions 19 of carriage bolts 13. As illustrated in the top view of FIG. 4, crossbars 11a and 11b are each arcuate, having a radius of curvature similar to that the of the adjacent portion 12' of windshield 12.

The shape of windshield 12 is relatively arbitrary, the substantially six-sided windshield illustrated being typical only of the type of windshields applicable to the present invention. Windshield 12 preferably is non-planar, however, with the convex surface 12a being oriented toward the front of the vehicle. A recessed region 20, best illustrated in FIGS. 1 and 2, may be provided adjacent the lower edge of windshield 12, to permit clearance for the brackets (not illustrated and not a part of this invention) conventionally used to attach central portion 14 of handlebar 10 to a motorcycle. Windshield 12 is provided with a spaced pair of through holes 21 (evident in FIG. 5), each of clearance diameter for receiving at least the threaded shank portion 19 of carriage bolt 13. The separation distance between holes 21 in windshield 12 is non-critical, since bolts 13 may be positioned anywhere along the elongate horizontal space or opening 18 between crossbars 11a and 11b, more conveniently than if the opening were confined to a pair of fixedly spaced apertures.

The preferred manner of attaching windshield 12 to crossbars 11a and 11b is illustrated in FIGS. 4 and 5. As shown therein, head 22 of carriage bolt 13 is situated in front of crossbars 11a and 11b, and through hole 21. Carriage bolt 13 is fastened with an appropriate acorn or other nut 23. A front metal washer 24 and a rear metal washer 25 are used to distribute the force of carriage bolt head 22 and nut 23, respectively. A fiber washer 26 situated between metal washer 24 and crossbars 11a and 11b serves as shock-absorbing insulation and protects the finish of the crossbars which may be chrome-plated. Similarly, a pair of fiber washers 27 and 28, situated on opposite sides of window 12, provide a firm yet resilient mounting for window 12 to prevent damage which might otherwise occur, for example, by excess tightening of nut 23, or by stress resulting from the force of the wind against windshield 12. A cylindrical spacer 29 of preferably plastic composition fits within hole 21 to prevent threaded shank 19 from contacting windshield 12 directly.

It will be appreciated from the foregoing description that the inventive combination windshield and handlebar combines extreme simplicity of construction with exceptional functionality and attractive appearance. In the latter regard, note that exposed carriage bolt head 22 and washer 24 themselves constitute decorative embellishment and may be constructed or formed in even more decorative manner.

Alternatively, a crest, eagle or other decorative embellishment may be attached to carriage bolt 13 in place of, or in addition to, washer 24. The manner of assembly illustrated permits easy, rapid removal or replacement of windshield 12, should this be required. Further, the spacing of holes 21 in the replacement windshield is not critical, since bolts 13 may be situated anywhere within the elongated opening 18 between crossbars 11a and 11b of the illustrated preferred embodiment.

What is claimed is:

1. In combination with a handlebar for a motorcycle-type vehicle, said handlebar comprising a central section adapted for mounting to the vehicle in a generally horizontal plane, first and second portions of said handlebar angularly extending from respective ends of said central section:
crossbar means extending between and fixedly attached to said first and second handlebar portions, said crossbar means being horizontally arcuate;
a curved windshield of unitary plastic construction, the curvature of said crossbar means conforming substantially to the curvature of the adjacent portion of said windshield; and
means for removably attaching said windshield to said crossbar means, said means for attaching comprising a plurality of bolts extending through said windshield and said crossbar means.

2. In combination with a handlebar for a motorcycle-type vehicle, said handlebar comprising a central section adapted for mounting to the vehicle in a generally horizontal plane, first and second portions of said handlebar angularly extending from respective ends of said central section:
crossbar means extending between and fixedly attached to said first and second handlebar portions, said crossbar means comprising a pair of vertically spaced parallel crossbars defining an elongate horizontal opening therebetween;
crossbar means comprising a pair of vertically spaced holes therethrough; and
means for removably attaching said windshield to said crossbar means, said means for attaching comprising a like plurality of bolts extending through said holes and said opening.

3. The combination defined in claim 2 wherein each of said bolts extends consecutively through a first fiber washer, the opening between said crossbars, a second fiber washer, one of said holes, and a third fiber washer.

4. In combination with a unitary tubular handlebar for a motorcycle-type vehicle, said handlebar comprising a straight central section adapted for mounting to said vehicle in a substantially horizontal plane, first and second intermediate portions angularly extending from opposite ends of said central section, and first and second end portions angularly extending from respective ones of said intermediate portions:
a pair of arcuate, vertically spaced, parallel crossbars, the ends of said crossbars being fixedly attached respectively to said first and second intermediate portions, said crossbars being substantially parallel to said central section, said crossbars each having a substantially square cross-section;
a unitary convex plastic windshield having a pair of spaced holes therethrough; and
a pair of carriage bolts, each of said bolts extending, in order, through a first metal washer, a first fiber washer, the opening between said crossbars, a second fiber washer, one of said spaced holes, a third fiber washer, and a second metal washer, a nut fastening each of said bolts, thereby to attach said windshield to said crossbars, the curvature of said crossbars generally conforming to the curvature of the portion of said windshield adjacent thereto.

5. In combination with a handlebar for a motorcycle-type vehicle, said handlebar comprising a central section adapted for mounting to the vehicle in a generally horizontal plane, first and second portions of said handlebar angularly extending from respective ends of said central section:
crossbar means extending between and non-removably attached to said first and second handlebar portions;
a unitary windshield; and
attachment means for directly removably attaching said windshield to said crossbar means, said attachment means comprising:
(a) a pair of bolts, each having a shank, a head on one end, and a threaded portion on the other end, said bolts extending through said windshield and through said crossbar means, each said head and threaded portion being exposed;
(b) a corresponding pair of nuts each threadedly engaged on a respective said threaded portion for securing said windshield to said crossbar means; and
(c) resilient means mounted on each said shank between said crossbar means and said windshield so that said bolts and nuts compress said resilient means between said crossbar means and said windshield.

(References on following page)

References Cited

UNITED STATES PATENTS

| | | | |
|---|---|---|---|
| D. 129,391 | 9/1941 | Fischer | 74—551.8 |
| D. 213,163 | 1/1969 | Stone | D90—11 |
| 1,380,471 | 6/1921 | Francisco | 296—84 |
| 1,387,349 | 8/1921 | Campbell | 296—78.1 |
| 1,448,921 | 3/1923 | Ershkowitz | 74—551.8 |
| 1,660,131 | 2/1928 | Lenfers | 74—551.8 |
| 2,396,493 | 3/1946 | Comiskey | 296—78.1 |
| 3,369,836 | 2/1968 | Haycock et al. | 296—78.1 |
| 2,414,244 | 1/1947 | Roth | 280—12X |

KENNETH H. BETTS, Primary Examiner

U.S. Cl. X.R.

74—551.1